United States Patent
Edling et al.

(10) Patent No.: US 11,718,286 B2
(45) Date of Patent: Aug. 8, 2023

(54) METHOD FOR CONTROLLING A PARKING PROCESS

(71) Applicant: Continental Teves AG & Co. OHG, Frankfurt am Main (DE)

(72) Inventors: Frank Edling, Schwalbach (DE); Hendrik Deusch, Wiesbaden (DE); Sharmila Ghosh, Mainz (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 22 days.

(21) Appl. No.: 16/648,460

(22) PCT Filed: Oct. 24, 2018

(86) PCT No.: PCT/DE2018/200096
§ 371 (c)(1),
(2) Date: Mar. 18, 2020

(87) PCT Pub. No.: WO2019/080975
PCT Pub. Date: May 2, 2019

(65) Prior Publication Data
US 2020/0231141 A1     Jul. 23, 2020

(30) Foreign Application Priority Data
Oct. 27, 2017 (DE) ..................... 10 2017 219 351.4

(51) Int. Cl.
*B60W 30/06*     (2006.01)
*B60W 60/00*     (2020.01)
(Continued)

(52) U.S. Cl.
CPC ............ *B60W 30/06* (2013.01); *B60W 40/08* (2013.01); *B60W 60/0011* (2020.02);
(Continued)

(58) Field of Classification Search
CPC ............ B60W 30/06; B60W 60/0018; B60W 60/0011; B60W 40/08; B60W 2040/0809; G06K 9/00805; G08G 1/14
See application file for complete search history.

(56) References Cited

U.S. PATENT DOCUMENTS 9,747,791 B2    8/2017   Mayer et al.
9,862,379 B2    1/2018   Seo et al.
(Continued)

FOREIGN PATENT DOCUMENTS

CN         106097755 A    11/2016
DE         102006039583     3/2008
(Continued)

OTHER PUBLICATIONS

English translation of Korean Office Action in Korean Patent Application No. 10-2020-7008268, dated May 28, 2020, 10 pages.
(Continued)

*Primary Examiner* — Maceeh Anwari
*Assistant Examiner* — Charles Pall
(74) *Attorney, Agent, or Firm* — RatnerPrestia

(57) ABSTRACT

A method of controlling a parking process of a vehicle includes the following steps:
- identifying a driver;
- learning driver parameters during a manual parking process performed by the driver, and associating the driver parameters with the identified driver;
- determining parking parameters based on the driver parameters; and
- controlling, based on the parking parameters, an autonomous parking process of the vehicle performed by a parking assistance system.

21 Claims, 11 Drawing Sheets

(51) Int. Cl.
*B60W 40/08* (2012.01)
*G06V 20/58* (2022.01)
*G08G 1/14* (2006.01)

(52) U.S. Cl.
CPC ......... *B60W 60/0018* (2020.02); *G06V 20/58* (2022.01); *G08G 1/14* (2013.01); *B60W 2040/0809* (2013.01)

(56) References Cited

U.S. PATENT DOCUMENTS

| | | | |
|---|---|---|---|
| 10,407,008 | B2 | 9/2019 | Bonnet et al. |
| 10,875,576 | B2 | 12/2020 | Derendarz et al. |
| 11,281,211 | B2 | 3/2022 | Kawamoto |
| 2010/0036562 | A1 | 2/2010 | Becker |
| 2012/0287279 | A1* | 11/2012 | Tanaka ................... G08G 1/168 348/148 |
| 2013/0035821 | A1* | 2/2013 | Bonne ............... B60W 50/0097 701/25 |
| 2015/0100193 | A1 | 4/2015 | Inagaki et al. |
| 2015/0307089 | A1* | 10/2015 | Vorobieva ............. B60W 30/06 701/25 |
| 2017/0092130 | A1* | 3/2017 | Bostick .............. G01C 21/3685 |
| 2017/0096168 | A1* | 4/2017 | Yang ........................ G08G 1/14 |
| 2017/0369078 | A1 | 12/2017 | Freistadt et al. |
| 2018/0265130 | A1 | 9/2018 | Derendarz et al. |

FOREIGN PATENT DOCUMENTS

| | | | | |
|---|---|---|---|---|
| DE | 112009000349 | | 4/2011 | |
| DE | 102011100277 | | 11/2012 | |
| DE | 102013015349 | | 4/2014 | |
| DE | 102014018192 | | 6/2015 | |
| DE | 102014018189 | | 6/2016 | |
| DE | 102015203619 | | 9/2016 | |
| DE | 102015210428 | | 12/2016 | |
| DE | 102015210428 | A1 * | 12/2016 | |
| DE | 102016211180 | | 3/2017 | |
| DE | 102016120677 | | 5/2018 | |
| FR | 2982563 | A1 * | 5/2013 | ............. B60Q 9/006 |
| FR | 3027861 | A1 * | 5/2016 | ........ B62D 15/0285 |
| JP | 10-264840 | A | 10/1998 | |
| JP | 2004294264 | A | 10/2004 | |
| JP | 2006290051 | A | 10/2006 | |
| JP | 2010173464 | A | 8/2010 | |
| JP | 2013078151 | A | 4/2013 | |
| JP | 2013-082376 | A | 5/2013 | |
| JP | 2014-125195 | A | 7/2014 | |
| JP | 2015-074253 | A | 4/2015 | |
| JP | 2017-052470 | A | 3/2017 | |
| KR | 20150051550 | A | 5/2015 | |
| KR | 20160054926 | A | 5/2016 | |
| KR | 10-2017-0040633 | A | 4/2017 | |
| KR | 20170055318 | A | 5/2017 | |
| WO | WO 2009/101514 | | 8/2009 | |
| WO | WO-2009101514 | A1 * | 8/2009 | .............. G08G 1/14 |
| WO | WO 2015/039726 | | 3/2015 | |
| WO | WO 2015/166721 | | 11/2015 | |
| WO | WO-2016080452 | A1 * | 5/2016 | ............ B60W 30/00 |
| WO | WO 2017/041926 | | 3/2017 | |
| WO | 2017057060 | A1 | 4/2017 | |

OTHER PUBLICATIONS

European Office Action dated Apr. 30, 2021 in European Patent Application No. 18 807 554.3, 7 pages, with English partial translation, 5 pages.

English translation of the International Search Report of the International Searching Authority for International Application PCT/DE2018/200096, dated Feb. 20, 2019, 2 pages, European Patent Office, HV Rijswijk, Netherlands.

PCT International Preliminary Report on Patentability including English Translation of PCT Written Opinion of the International Searching Authority for International Application PCT/DE2018/200096, dated Apr. 28, 2020, 6 pages, International Bureau of WIPO, Geneva, Switzerland.

German Search Report for German Patent Application No. 10 2017 219 351.4, dated Aug. 8, 2018, 9 pages, German Patent and Trademark Office, Muenchen, Germany, with partial English translation, 7 pages.

European Office Action dated Nov. 11, 2021 in European Patent Application 18 807 554.3, 7 pages, with English partial translation, 5 pages.

Chinese Office Action for Chinese Application No. 201880067274.9, dated Jan. 29. 2022 with translation, 17 pages.

Japanese Notice of Reasons for Refusal for Japanese Application No. 2020-518424, dated Oct. 26, 2022 with translation, 17 pages.

Japanese Notice of Reasons for Refusal for Japanese Application No. 2020-518424, dated Apr. 24, 2023 with translation, 7 pages.

* cited by examiner

Fig. 2

| Parameters | | -40 | -35 | -30 | -25 | -20 | -15 | -10 | -5 | 0 | 5 | 10 | 15 | 20 | 25 | 30 | 35 | 40 |
|---|---|---|---|---|---|---|---|---|---|---|---|---|---|---|---|---|---|---|
| 2.1 Maneuvering speed as a function of the steer angle | Steer angle [°] | -40 | -35 | -30 | -25 | -20 | -15 | -10 | -5 | 0 | 5 | 10 | 15 | 20 | 25 | 30 | 35 | 40 |
| | Maneuvering speed [km/h] | -180 | -160 | -140 | -120 | -100 | -80 | -60 | -40 | -20 | 0 | 20 | 40 | 60 | 80 | 100 | 120 | 140 |
| 2.2 Maneuvering speed as a function of the steering angle speed | Steering angle speed [°/s] | | | | 1 | 1 | 2 | 2 | 3 | 8 | 8 | 8 | 2 | 1 | | | | |
| 2.3 Maneuvering speed as a function of the steer angle and the object distance | Steer angle [°] | -40 | -35 | -30 | -25 | -20 | -15 | -10 | -5 | 0 | 5 | 10 | 15 | 20 | 25 | 30 | 35 | 40 |
| | Distance from surrounding object [m] | 1.5 | | | | | | | | | | | | | | | | |
| | | 1.25 | | | | | 1 | | | | | | | 1 | | | | |
| | | 1 | | | | | | | | | | | | | | | | |
| | | 0.75 | | | | | | | | | | | 1.5 | | | | | |
| | | 0.5 | | | | | | | 0.5 | 0.5 | | 1 | | | | | | |
| | | 0.25 | | | | | | | | 0.5 | | | | | | | | |
| | | 0 | | | | | | | [Cell value: maneuvering speed in km/h] | | | | | | | | | |
| 2.4 Acceleration/deceleration gradient as a function of the object distance | Distance from surrounding object [m] | 3 | 2.5 | 2 | 1.5 | 1.25 | 1 | 0.9 | 0.8 | 0.7 | 0.6 | 0.5 | 0.4 | 0.3 | 0.2 | 0.1 | 0 | |
| | Deceleration gradient [m/s³] | 0.2 | 0.5 | 1 | 2 | 2 | 2 | 10 | 10 | 10 | | | | | 20 | | | |
| | Acceleration gradient [m/s³] | 3 | 2 | 1 | 1 | 1 | 0.2 | 0.2 | 0 | 0 | | | | | | | | |

| | | |
|---|---|---|
| 2.7 Parking preference of the driver for perpendicular parking: driving into parking space in forward direction, reversing into parking space | Driving into parking space in forward direction | 0 |
| | Reversing into parking space | 1 |
| 2.8 Parking preference of the driver for perpendicular parking: blocking of the front-seat passenger's door by the neighboring vehicle or arrangement of the vehicle in the middle of the parking space (if a perpendicular parking space has been recognized and only the driver's seat is occupied) (Boolean value) | Vehicle arranged centrally | 1 |
| | Vehicle offset towards front-seat passenger's side | 0 |
| | Vehicle offset towards driver's side | 0 |
| 2.9 Parking preference of the driver for parallel parking: centering of the vehicle in the parking space, larger distance at the back or larger distance at the front (numerical value {0, 1, 2}) | Vehicle arranged centrally | 0 |
| | More space at the back | 0 |
| | More space at the front | 1 |
| | Distance at the front, maneuvering space | 0.6 |
| 2.10 Driver's acceptance of target position accuracy vs. parking moves required to reach the target position | Parking moves of the driver | 5 |
| | Calculated min. number of parking moves to reach target position | 7 |
| | Deviation in the x-direction [m] | 0.3 |
| | Deviation in the y-direction [m] | 0.4 |
| | Deviation of the alignment angle [°] | 2.5 |
| Parking maneuver type (parallel parking "0", perpendicular parking "1", diagonal parking "2" ...) | | 0 |

| Parameters | | Values (example) | | | | | | | | | | | | | | | | | |
|---|---|---|---|---|---|---|---|---|---|---|---|---|---|---|---|---|---|---|---|
| 2.1 Maneuvering speed as a function of the steer angle | Steer angle [°] | | -40 | -35 | -30 | -25 | -20 | -15 | -10 | -5 | 0 | 5 | 10 | 15 | 20 | 25 | 30 | 35 | 40 |
| | Maneuvering speed [km/h] | 20 | 0 | | | | | 2 | 2 | 3 | 8 | 3 | 2 | 2 | | | | | 0 |
| 2.2 Maneuvering speed as a function of the steering angle speed | Steering angle speed [°/s] | | -180 | -160 | -140 | -120 | -100 | -80 | -60 | -40 | -20 | 0 | 20 | 40 | 60 | 80 | 100 | 120 | 140 |
| | Maneuvering speed [km/h] | 20 | 0 | | | | 1 | 1 | 2 | 2 | 3 | 8 | 3 | 2 | 2 | 1 | 1 | | 0 |
| 2.3 Maneuvering speed as a function of the steer angle and the object distance | Steer angle [°] | | -40 | -35 | -30 | -25 | -20 | -15 | -10 | -5 | 0 | 5 | 10 | 15 | 20 | 25 | 30 | 35 | 40 |
| | | | 1.5 | | | | | | | | | | | | | | | | |
| | | | 1.25 | | | | | 2 | | | | | | | | | | | |
| | Distance from surrounding object [m] | 50 | 1 | | | | | | 1 | | | | | | 1 | | | | |
| | | | 0.75 | | | | | | | | | | | 1.5 | | | | | |
| | | | 0.5 | | | | | | | 0.5 | 0.5 | | | | | | | | |
| | | | 0.25 | | | | | | | | 0.5 | | | | | | | | |
| | | | 0 | | | | | | | | | | | | | | | | |
| | | | | | | | | | | [Cell value: maneuvering speed in km/h] | | | | | | | | | |
| 2.4 Acceleration/deceleration gradient as a function of the object distance | Distance from surrounding object [m] | 10 | 3 | 2.5 | 2 | 1.5 | 1.25 | 1 | 0.9 | 0.8 | 0.7 | 0.6 | 0.5 | 0.4 | 0.3 | 0.2 | 0.1 | 0 | | |
| | Deceleration gradient [m/s³] | | 0.2 | 0.5 | 1 | 2 | 2 | 2 | 10 | 10 | 10 | | | | | 20 | | | | |
| | Acceleration gradient [m/s³] | | 3 | 2 | 1 | 1 | 1 | 0.2 | 0.2 | 0 | | | | | | | | | | |
| 2.7 Parking preference of the driver for perpendicular parking: driving into parking space in forward direction, reversing into parking space | Driving into parking space in forward direction | 10 | 1 | | | | | | | | | | | | | | | | | |
| | Reversing into parking space | | 9 | | | | | | | | | | | | | | | | | |
| 2.8 Parking preference of the driver for perpendicular parking: blocking of the front-seat passenger's door by the neighboring vehicle or arrangement of the vehicle in the middle of the parking space (if a perpendicular parking space has been recognized and only the driver's seat is occupied) (Boolean value) | Vehicle arranged centrally | 10 | 0 | | | | | | | | | | | | | | | | | |
| | Vehicle offset towards front-seat passenger's side | | 4 | | | | | | | | | | | | | | | | | |
| | Vehicle offset towards driver's side | | 3 | | | | | | | | | | | | | | | | | |
| 2.9 Parking preference of the driver for parallel parking: centering of the vehicle in the parking space, larger distance at the back or larger distance at the front (numerical value {0, 1, 2}) | Vehicle arranged centrally | 10 | 1 | | | | | | | | | | | | | | | | | |
| | More space at the back | | 0 | | | | | | | | | | | | | | | | | |
| | More space at the front | | 9 | | | | | | | | | | | | | | | | | |
| | Distance at the front, maneuvering space | | 0.65 | | | | | | | | | | | | | | | | | |

Fig. 3

|  | Additional parking moves to reach the next zone ||| Type of maneuver |
| --- | --- | --- | --- | --- |
|  | Outside the target area -> low accuracy | Low accuracy -> average accuracy | Average accuracy -> high accuracy |  |
| Zone x | 3.0 | 3.0 | 1.0 | Parallel |
| Zone y | 3.0 | 3.0 | 3.0 | |
| Alignment angle | 0.0 | 1.0 | 0.0 | |
| Zone x | 3.7 | 3.7 | 1.2 | Perpendicular forward |
| Zone y | 3.7 | 3.7 | 3.7 | |
| Alignment angle | 0.0 | 1.2 | 1.1 | |
| Zone x | 2.6 | 2.6 | 0.9 | Perpendicular backward |
| Zone y | 2.6 | 2.6 | 2.6 | |
| Alignment angle | 0.0 | 0.9 | 0.8 | |
| Zone x | 1.5 | 1.5 | 0.5 | Diagonally forward |
| Zone y | 1.5 | 1.5 | 1.5 | |
| Alignment angle | 0.0 | 0.5 | 0.0 | |

Fig. 6

| | Additional parking moves to reach the next zone | | | Type of maneuver |
|---|---|---|---|---|
| | Outside the target area -> low accuracy | Low accuracy -> average accuracy | Average accuracy -> high accuracy | |
| Zone x | 3.0 | 3.0 | 1.0 | Parallel |
| Zone y | 3.0 | 3.0 | 3.0 | |
| Alignment angle | 0.0 | 1.0 | 0.0 | |
| Zone x | 3.7 | 3.7 | 1.2 | Perpendicular forward |
| Zone y | 3.7 | 3.7 | 3.7 | |
| Alignment angle | 0.0 | 1.2 | 1.1 | |
| Zone x | 2.6 | 2.6 | 0.9 | Perpendicular backward |
| Zone y | 2.6 | 2.6 | 2.6 | |
| Alignment angle | 0.0 | 0.9 | 0.8 | |
| Zone x | 1.5 | 1.5 | 0.5 | Diagonally forward |
| Zone y | 1.5 | 1.5 | 1.5 | |
| Alignment angle | 0.0 | 0.5 | 0.0 | |

Fig. 7

METHOD FOR CONTROLLING A PARKING PROCESS

FIELD OF THE INVENTION

The invention relates to a method for controlling a parking process of a vehicle as well as a vehicle having a parking assistance system.

BACKGROUND INFORMATION

Parking assistance systems, by means of which a parking process can be performed in a partly automated manner or respectively in a fully automated manner, are already known from the prior art. The parking assistance system can perform the parking process if the driver is in the vehicle, or the parking assistance system offers the possibility of the driver not being in the vehicle during the parking process, i.e. starting the parking process remotely, for example by means of a vehicle key, an application on a smartphone, etc.

However, the disadvantage of the known parking assistance systems is that different drivers have different expectations of the driver assistance system. Thus, for example, a first driver wants to have a parking process performed as quickly as possible with lower accuracy, whereas a second driver expects the parking process to be performed more slowly with higher accuracy.

SUMMARY OF THE INVENTION

Starting from this, it is an object of the invention to indicate a method for controlling a parking process which makes possible a user-specific parking behavior.

The above object can be achieved by a method having the features of the invention as set forth herein. Preferred embodiments are further disclosed. A vehicle having a parking assistance system is the subject-matter of a further aspect of the invention.

According to a first aspect, the invention relates to a method for controlling a parking process of a vehicle by means of a parking assistance system. The method comprises the following steps:

Firstly, a driver is identified. This can be effected, for example, by vehicle key recognition, wherein the vehicle key has been associated with a specific driver. Alternatively, this can be effected by means of a plurality of other methods and recognition means for recognizing drivers, for example by recognizing a mobile terminal associated with a driver (for example a mobile phone or a smartphone), a chip card, RFID, by fingerprint recognition, by scanning driver-specific facial or respectively eye characteristics, etc.

Driver parameters are subsequently learned during a parking process performed by the driver and associated with the identified driver. In particular, information is captured regarding how quickly a specific driver performs a parking process, how quickly the latter approaches objects located in the surroundings, how closely the latter approaches objects located in the surroundings and how precisely a driver parks in a parking space. In this case, "precisely" means in particular a positional accuracy of the vehicle in the longitudinal and transverse direction and/or the angular accurate alignment of the longitudinal axis of the vehicle relative to the longitudinal axis of the parking space (hereinafter referred to as the alignment angle).

Following the learning process, parking parameters are determined on the basis of the learned driver parameters. This is effected in particular by extracting information from the driver parameters, which indicates how a specific driver usually performs a parking process. This extracted information is applied in the form of parking parameters in the parking assistance system or parking parameters are deduced from the extracted information which are then applied. This means that the parking assistance system is modified on the basis of the extracted information in such a way that a driver-specific parking behavior of the parking assistance system is adjusted.

Subsequently, the parking process of the vehicle performed by a parking assistance system can be controlled on the basis of the parking parameters.

The material advantage of the method according to the invention is that the parking assistance system can be adapted depending on the user such that a natural parking behavior of the parking assistance system is adjusted for the respective driver.

The learning of driver parameters from parking processes performed by the driver can be carried out by a machine learning method, for example using neural networks.

According to an exemplary embodiment, the step of learning driver parameters comprises capturing the vehicle speed, the steer angle, a steering angle speed, at least one distance value of an object relative to the vehicle in the surrounding region of the vehicle and/or acceleration or respectively deceleration parameters of the vehicle. In particular, the driver parameters are captured by scanning with a scanning rate of less than 1 sec., in particular 100 ms and stored in a measured value array. As a result, driver-specific parking behavior can be deduced from the detected driver parameters.

According to an exemplary embodiment, the step of learning driver parameters comprises capturing the vehicle speed as a function of the steer angle, capturing the vehicle speed as a function of the steering angle speed, capturing the vehicle speed as a function of the steer angle and a distance value of an object relative to the vehicle in the surrounding region of the vehicle and/or acceleration or respectively deceleration parameters of the vehicle as a function of a distance value of an object relative to the vehicle in the surrounding region of the vehicle. In particular, the driver parameters are captured by scanning with a scanning rate of less than 1 sec., in particular 100 ms and are stored in a measured value array. As a result, user-specific parking characteristics (e.g. how quickly an object is driven toward during parking, how abruptly the vehicle is braked, etc.) can be captured and can be used to adapt the parking assistance system.

According to an exemplary embodiment, the step of learning driver parameters comprises collecting a plurality of measured values at chronologically successive measurement time points and establishing an average value of said measured values. For example, after a predefined number of automatically performed parking processes (in particular separately for the respective type of parking maneuver (forward, backward, laterally, etc.), an average value of measured values can be established such that, for example, an unusually rapidly performed parking process does not have any considerable repercussions on the parking processes performed by the parking assistance system. Equally, the statistical significance of a specific driver parameter can be established in order to decide whether the driver parameter can be used to adapt the parking assistance system or not.

According to an exemplary embodiment, the step of learning driver parameters additionally includes capturing and storing information regarding the parking direction, information regarding the alignment of the parked vehicle relative to the parking space following the completion of the parking process, information regarding the required parking moves and/or the type of parking process (perpendicular, diagonal, parallel, etc.). As a result, the parking assistance system can be selectively adjusted to the respective user for different parking scenarios.

According to an exemplary embodiment, the step of learning driver parameters includes a step of checking whether parking process characteristics established during the parking process performed by the driver are each located within a defined range. Thus, one or more thresholds can, for example, be specified as parking process characteristics, for example those which indicate whether the parking accuracy of the driver has achieved at least a minimum accuracy. Alternatively or additionally, it can be established whether the number of parking moves which the driver expended in order to reach the parking position has not exceeded an upper limit of parking moves. Alternatively or additionally, it can furthermore be established whether the maximum acceleration values (positive acceleration and/or negative acceleration during braking) achieved during the parking process have not exceeded at least one maximum acceleration value. The learned driver parameters are then only enlisted in order to determine parking parameters if the parking process characteristics are each located within the defined range or respectively have not exceeded or respectively have not fallen short of limits. As a result, it can be achieved that only those parking maneuvers performed by the driver which meet certain minimum requirements are enlisted in order to adapt the parking assistance system.

According to an exemplary embodiment, the step of determining parking parameters includes a step for averaging multiple driver parameters which have been established by a minimum number of parking processes performed by the identified driver. As a result, the parking assistance system is not abruptly adjusted, but rather is steadily adjusted to the latter's parking habits, taking account of an average driver-specific parking behavior.

According to an exemplary embodiment, the step of learning driver parameters comprises determining at least one tolerance parameter which indicates how far the parking position, to which the vehicle has been moved by means of the parking process performed by the driver, deviates from a nominal parking position determined by the parking assistance system. On the basis of this tolerance parameter, it can be established whether a specific vehicle user prefers a very high parking accuracy (e.g. central arrangement of the vehicle in the parking space, alignment of the vehicle longitudinal axis relative to the parking space, etc.) or tolerates deviations from a nominal parking position. On the basis thereof, the parking assistance system can control the parking process, namely for example in such a way that the automated parking process is performed with a lower number of parking moves and a higher deviation from a nominal parking position, or the driver tolerates a higher number of parking moves in order to obtain a lower deviation from a nominal parking position.

According to an exemplary embodiment, the determination of at least one tolerance parameter comprises a deviation of the position of the parked vehicle from the nominal position in a first and a second spatial direction (e.g. x- and y-direction) as well as a deviation of an alignment angle of the vehicle from a nominal alignment angle (in particular alignment of the vehicle longitudinal axis relative to the longitudinal axis of the parking space). As a result of these parameters, the parking accuracy of the respective driver can be determined relative to a nominal parking position for the respective parking position.

According to an exemplary embodiment, the determination of at least one tolerance parameter comprises determining the number of parking moves in order to reach the parking position. It can thus be ascertained how many parking processes a specific driver accepts during an automatically performed parking process.

According to an exemplary embodiment, in order to determine at least one tolerance parameter, at least one first and one second accuracy zone are established. It is in addition established how many parking moves the driver of the vehicle required in order to arrive in the first accuracy zone or respectively to travel from the first accuracy zone to the second, higher accuracy zone. This number of parking moves is then stored as driver-specific parking move information. As a result, a parking process can be subdivided into multiple accuracy stages, wherein a two-dimensional accuracy zone is associated with each accuracy stage. It is understood that more than two accuracy zones can also be determined or respectively used. The total number of parking moves is then subdivided into multiple partial numbers of parking moves, wherein each partial number indicates how many parking moves have been used in order to reach a specific accuracy zone.

According to an exemplary embodiment, the number of necessary parking moves in order to arrive in the first accuracy zone or respectively to travel from the first accuracy zone to a second, higher accuracy zone is established separately for vehicle position values in at least two spatial directions and the alignment angle of the vehicle. As a result, a subsequent maneuvering in the parking space, by means of which the alignment angle of the vehicle but not the vehicle position (in the x- and y-direction) has been improved, can be captured, for example, and can be enlisted in order to adapt the parking assistance system.

According to an exemplary embodiment, during the step of controlling a parking process by the parking assistance system it is established after reaching the first accuracy zone how many parking moves would be required by the parking assistance system in order to reach the second, higher accuracy zone, and it is decided by means of a comparison with the driver-specific parking move information whether the parking process controlled by the parking assistance system is continued in order to achieve a higher parking accuracy. Thus, it can be established, for example, that the parking assistance system would require three further parking moves in order to travel from the first accuracy zone to the second, next higher accuracy zone. However, in the event that the driver-specific parking move information indicates that the driver only executes two further parking moves in such a case, the parking assistance system would not continue the parking process. If, however, it is clear from the driver-specific parking move information that the driver usually accepts three or more parking moves in order to reach the second accuracy zone, the parking assistance system would continue the parking process in order to achieve a higher parking accuracy.

According to an exemplary embodiment, on the basis of the established driver parameters, the planning of the parking trajectory and/or the movement sequence of the vehicle on said parking trajectory is/are influenced. Thus, the vehicle speed can, for example, be adjusted during the trajectory planning at any point of the parking trajectory to the vehicle speed which the driver typically uses during parking processes. In particular, this can also include the vehicle speed as a function of a distance from a surrounding object. The acceleration or respectively the braking behavior or respectively the distances from objects in the surroundings can equally be adjusted to the user-specific parking habits during the automated parking process.

According to an exemplary embodiment, interactions of the driver with vehicle control means and/or information regarding the driver himself is/are captured during a parking process performed by the parking assistance system and, on the basis thereof, the parking parameters are adjusted. Thus, braking operations, steering interventions, interactions with a vehicle interface (for example, deactivating the parking assistance system), opening of doors, gear-shifting operations and/or clutch operations performed by the driver can be captured for example. On the basis of said captured information, the parking parameters influencing the parking assistance system can be adjusted accordingly (for example increasing the distance from surrounding objects, reducing the speed, etc.).

According to an exemplary embodiment, the parking parameters are gradually adjusted depending on the number of parking processes performed by the parking assistance system and associated with the identified driver. In particular, the safety distance from a surrounding object is gradually reduced and/or the speed of the vehicle is gradually increased during the parking process. As a result, it can be achieved that the parking assistance system is adapted over time since it is to be assumed that a driver will have confidence in the parking system following a lengthy period of using the system.

According to an exemplary embodiment, driver preferences are additionally considered during the determination of parking parameters. These driver preferences can, for example, be inputs made by the respective driver and associated with the latter. These can be retrieved during an initialization process and/or in the event of a parking situation occurring, which makes information regarding a driver preference necessary.

The driver preferences can, for example, include information regarding permission to park in parking lots for the disabled, regarding parking in parking spaces reserved for women or mothers and children, regarding the willingness to pay for parking, permission to park in parking lots reserved for residents in a specific region, regarding the acceptance of driving over curbs, regarding the willingness to drive forward directly into a parking space, regarding the willingness to react to changes in the parking situation during the parking process and/or a preference to drive forward or respectively to reverse into a parking space.

According to an exemplary embodiment, driver interventions (e.g. braking interventions, steering interventions, interventions at a user interface, etc.) and/or physical data (e.g. pulse rate, facial expression, movements, skin temperature, skin moisture, skin color, etc.) of the driver are established during a parking process performed by the parking assistance system and parking parameters of the parking assistance system are adjusted depending on the occurrence of driver interventions or respectively the captured physical data. If, for example, it is recognized by means of at least one driver intervention that the driver is not confident in the parking process performed by the parking assistance system, the parking parameters can, for example, be adjusted toward a greater sense of security (e.g. greater distances from surrounding objects, lower speed, etc.).

Conversely, it is of course also possible to adjust the parking parameters, for example, toward a lower sense of security (e.g. smaller distances from surrounding objects, higher speed, etc.).

According to a further aspect, the invention relates to a vehicle comprising a parking assistance system for controlling a parking process of the vehicle. The vehicle comprises:
  identifying means for identifying a driver;
  sensor means for capturing driver parameters during a parking process performed by the driver;
  at least one memory unit for saving the driver parameters, wherein the driver parameters associated with the identified driver are saved;
  at least one computer unit which is designed to determine parking parameters on the basis of the learned driver parameters; and
  a parking assistance system which is designed to automatically control the parking process of the vehicle on the basis of the parking parameters.

The term "parking process" is used within the meaning of the present invention to denote processes in which a vehicle is maneuvered forward, backward, sideward or diagonally into a parking space. Parking processes comprise both processes for driving into and pulling out of parking spaces. The driver can be located in the vehicle during the parking process or the driver can be outside the vehicle (remote parking process).

The term "driver parameters" is used within the meaning of the present invention to denote any parameters, on the basis of which it is possible to judge a driver-specific parking behavior.

The term "parking parameters" is used within the meaning of the present invention to denote parameters, by means of which a parking assistance system can either be directly adapted or from which information can be deduced, by means of which an adaptation of the parking assistance system is possible.

The expressions "approximately", "substantially" or "roughly" within the meaning of the invention mean deviations from the precise value in each case of +/−10%, preferably of +/−5% and/or deviations in the form of changes which are not important for the function.

Further developments, advantages and possible applications of the invention are also set out by the following description of exemplary embodiments and by the figures. All of the features described and/or pictured, whether alone or in any combination, essentially form the subject-matter of the invention, independently of the summary thereof in the claims or references back thereto. The content of the claims is also made an integral part of the description.

BRIEF DESCRIPTION OF THE DRAWINGS

The invention is explained in greater detail below by means of exemplary embodiments with reference to the figures, wherein:

FIG. 2 shows by way of example and schematically a table containing a plurality of driver parameters which have been obtained following a parking process;

FIG. 3 shows by way of example and schematically a table containing a plurality of driver parameters which have been obtained by a plurality of parking processes;

FIG. 6 shows by way of example a table clearly showing a driver-specific parking behavior in the form of additional parking moves in order to take up an improved parking position;

FIG. 7 shows by way of example a table clearly showing the number of parking moves of a driver in order to take up an improved parking position following a plurality of parking processes performed by the driver;

DETAILED DESCRIPTION OF EXAMPLE
EMBODIMENTS OF THE INVENTION

Figure 1:
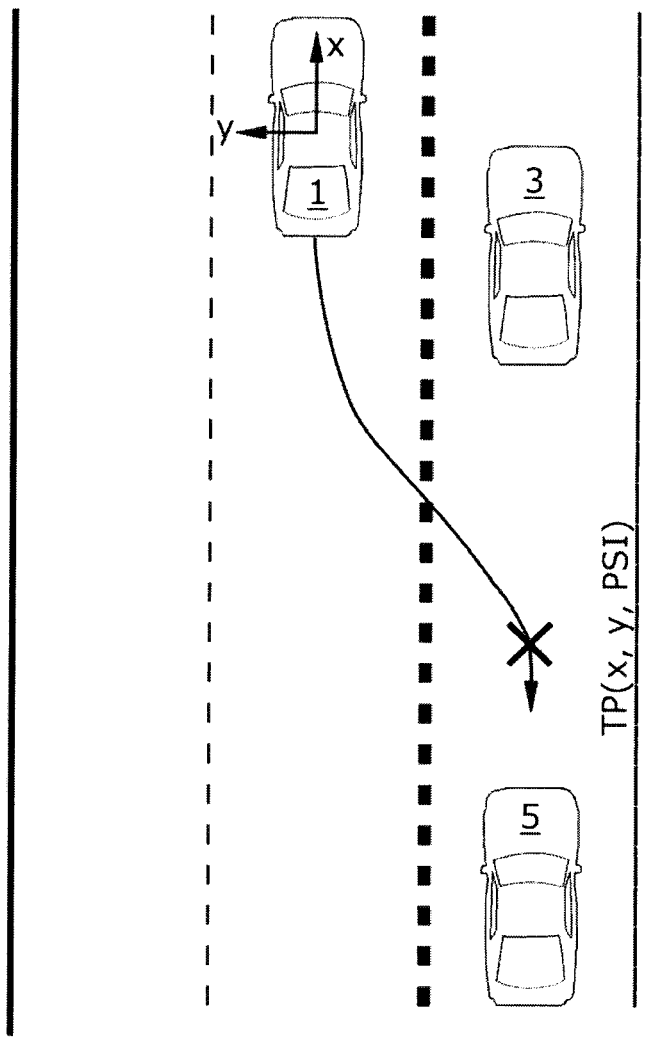
FIG. 1 shows by way of example and schematically a parallel parking situation of a vehicle from a starting position into a parking position.

FIG. 1 shows a parallel parking process involving reversing from a current location of the vehicle into a parking position TP(x, y, PSI).

Learning Driver Parameters

Different drivers have a different parking behavior (speed, safety distances, selected route into the parking space). In order to guarantee a natural parking behavior of the parking assistance system for each driver, the parking assistance function learns driver parameters during a parking process performed by the driver, and subsequently calculates parameters, hereinafter referred to as parking parameters, for the parking assistance function of these learned driver parameters. The parking assistance function is subsequently adjusted on the basis of the parking parameters in order to obtain a natural parking behavior for each driver.

Adjusting the Parking Assistance System to the Driver's Level of Confidence

The parking assistance system also preferably takes account of the fact that the driver's confidence in the function will be low the first time he utilizes the parking assistance system, but that his confidence will later grow. At the start, a driver is usually concerned if, for example, the vehicle moves very close to objects in the surroundings but, after utilizing the parking assistance function for a longer period of time, the driver becomes confident in this function. The parameters of the parking assistance function are advantageously converted over time from an operational state which is concerned about safety into an operational state which is designed for higher performance.

The parking assistance system preferably comprises a learning algorithm which is designed to move the parameters of the parking assistance system toward a higher level of safety, or respectively an operational state concerned about safety, especially if the parking assistance system ascertains that a driver feels unsafe during a parking process performed by the parking assistance system. For example, driver interventions (by way of example braking, steering, control interventions at a user interface of the parking assistance system) are captured and evaluated during the parking process performed by the parking assistance system. Additionally, the stress level of the driver can preferably be measured in order to likewise draw conclusions therefrom about how safe the driver feels during a parking process performed by the parking assistance system. The facial expression, movements, skin temperature, skin moisture and/or skin color of the driver can, for example, be evaluated by a camera located in the vehicle interior. Alternatively or additionally, sensors can for example be provided in the driver seat in order to be able to measure the pulse rate of the driver.

Figure 10:
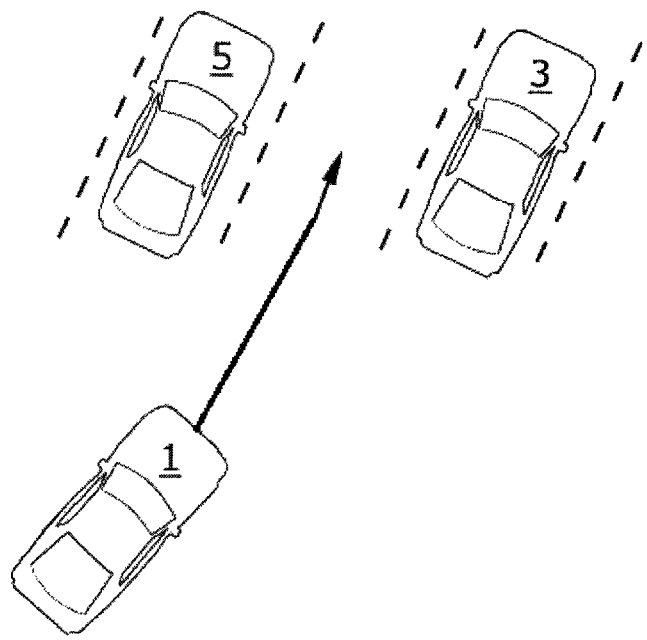
FIG. 10 shows by way of example and schematically a diagonal forward parking situation.
Figure 11:
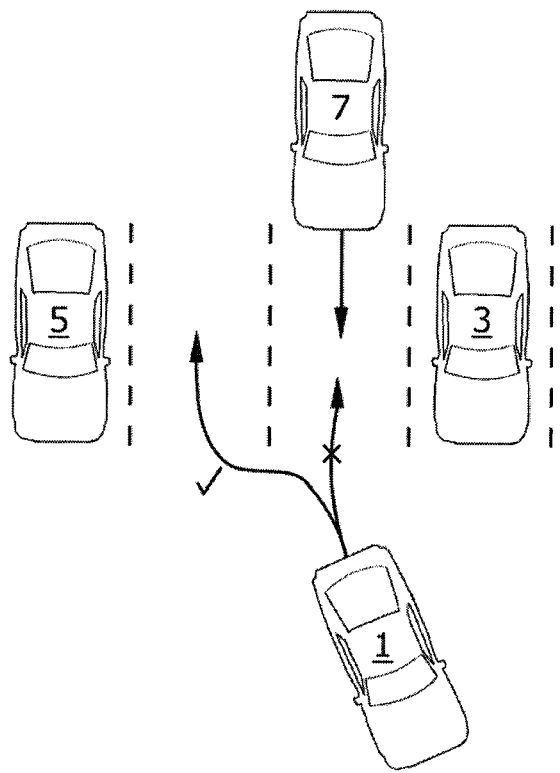
FIG. 11 shows by way of example and schematically the reaction of a parking assistance system to a parking situation altered by a further parking vehicle.

Adjusting the Parking Assistance Function to Driver-Specific, Preferred Settings A known function is the identification of the driver of the vehicle by the latter's own key or a keyless access card. According to the prior art, the seated position setting is, for example, adjusted according to the personal preferences of the driver if the latter opens the door of the vehicle with his personal key. The entire parking assistance function is preferably personalized in order to adjust to the specific driver requirements. The following parking assistance function settings can, for example, be adjusted for the respective driver of the vehicle:

Selectability of parking in parking spaces reserved for the disabled: the parking assistance function offers parking spaces for disabled persons as well or in particular;

Feasibility of parking in parking spaces reserved for women: the parking assistance function offers parking spaces which are reserved for women as well or in particular;

Willingness to pay for parking spaces: the parking assistance function also offers parking spaces which are subject to a charge;

Feasibility of residents' parking spaces: the parking assistance function offers such parking if the driver has specified where he lives and the surrounding area by means of location coordinates. The parking assistance function preferably asks for confirmation if the latter is used to parking outside residents' parking spaces;

Switching on of parking settings: willingness to drive over curbstones; parking in front of or respectively behind individual vehicles; willingness to allow the parking function to "drive forward directly into the parking space" (see FIG. 10); willingness to react to a change in the parking situation during the parking process, for example by selecting an alternative parking space (see FIG. 11);

preferred parking direction: forward or backward in the case of a parking space perpendicular to the direction of travel.

The driver can, for example, configure all of these parameters before he utilizes the parking assistance function. However, most drivers do not want to do so. Another option is to ask the driver the first time a parking space which has special characteristics is recognized whether this parking space is to be selected. Thus, for example, if a parking space reserved for disabled persons is recognized, the system can indicate to the driver that a parking space for disabled persons has been recognized and it can ask the driver whether he is entitled to park in such a parking space.

Learning Driver Parameters

First Step—Detecting a Parking Process Performed by the Driver 1.1 The detection of a parking process performed by the driver is started by the following logic:
1) A parking space recognition logic of the parking assistance function recognizes a suitable parking space, and
2) The vehicle is at least a minimum distance (in the x- and y-direction) from said parking space, and
3) The vehicle is less than a maximum distance (in the x- and y-direction) from said parking space; and
4) The vehicle is not moving/is stationary.

If these conditions are met, a trajectory planner calculates the number of required parking moves to at least one recognized parking space.

FIG. 1 shows a target position (target pose TP) and a vehicle 1 in a x-y-coordinate system with reference to the vehicle. The target position is situated between two vehicles 3, 5 in the exemplary embodiment shown.

1.2 The learning of the driver parameters starts or is continued after
1) First gear is selected (in the case of a manual transmission) or Drive "D" in the case of an automatic transmission or reverse gear or respectively Reverse "R" (in the case of an automatic transmission) is selected; and
2) The vehicle is moving at a vehicle speed below a maximum speed which can be, for example, 10 km/h.

1.3 The learning function is stopped and the learned driver parameters are stored if
1) The vehicle has been parked in one of the recognized, valid parking spaces and the overlap of the vehicle with the area of the recognized parking space is a minimum value, for example 70%, and
2) The number of parking moves which the driver required to maneuver the vehicle into the parking space is below a maximum number of parking moves, for example is less than 3; and
3) The maximum acceleration values which occurred during the parking process (negative during braking, positive during accelerating) are within a nominal value range, for example in a range between $-4$ m/s$^2$ and $4$ m/s$^2$.

This ensures that only parking processes which have been performed "well" are used for teaching the parking assistance function. As a result, parking processes performed by the driver having too many parking moves or parking processes with too abrupt braking are, for example, excluded from the learning process.

Second Step—Learning Driver Parameters

This step is preferably performed as long as the aforementioned condition 1.2 is valid. During the learning phase, the parameter arrays indicated below are filled with values which have been obtained by scanning at a scanning rate of between 10 ms and 1 sec, for example, in particular 100 msc. Following the learning phase, the fields of the individual parameter arrays each contain an average value which is obtained by averaging across all of the scanning values.

In particular, the following driver parameters are captured (see FIG. 2):

2.1 Maneuvering speed as a function of the steer angle;
2.2 Maneuvering speed as a function of the steering angle speed;
2.3 Maneuvering speed as a function of the steer angle and the distance from at least one surrounding object;
2.4 Acceleration/braking gradient as a function of the distance from at least one surrounding object;

At the end of step 1.3, the following values are in addition saved:

2.7 Parking direction preferred by the driver in the case of perpendicular parking spaces: driving forward into a parking space, reversing into a parking space (Boolean value);
2.8 Arrangement of the vehicle in the parking space preferred by the driver in the case of perpendicular parking spaces: blocking the front seat passenger door of the ego-vehicle or respectively of the adjacent vehicle or centering of the vehicle in the parking space (Boolean value);
2.9 Arrangement of the vehicle in the parking space preferred by the driver in the case of parallel parking spaces: centering of the vehicle in the parking space or observing a larger gap in front of or respectively behind the ego-vehicle (for example coded by numerical values 0, 1, 2)
2.10 Parking accuracy desired by the driver (i.e. reaching a nominal parking position) vs. number of expended parking moves.

The parking assistance system preferably additionally saves the following information:

Parking moves for the parking maneuver performed by the driver;
Calculated minimum number of parking moves in order to reach the precise parking position (nominal parking position) by the parking assistance system;
The deviation of the parking position taken up by the driver from the calculated nominal parking position (for example, deviation in the x- and y-direction as well as in the alignment angle of the vehicle (with reference to a nominal alignment angle)).

At the end of the second step, a set of driver parameters for a parking maneuver has been learnt (see set of parameters according to FIG. 2). This set of parameters is saved and used in a learning function for a plurality of parking maneuvers in the next step.

In addition to these parameters, the type of parking process (e.g. perpendicular parking, parallel parking, diagonal parking, etc.) can also be saved.

Third Step—Calculating Parking Parameters in Order to Adapt the Parking Assistance System on the Basis of Driver Parameters from Multiple Parking Maneuvers In this step, the data which have been established in multiple parking maneuvers are evaluated in order to obtain a driving behavior of the driver which is generally or respectively on average adopted, in order to adjust the parameters of the parking assistance system.

For the parameters previously established in points 2.1 to 2.9:
1) A number of required parking maneuvers performed by the driver himself is specified, in order to learn parking parameters;
2) Average values of the saved driver parameters are calculated;
3) A statistical significance is established in order to ascertain whether the driver parameters are to be used to adjust the parking assistance system or not.

Example

| 2.7 Preferred parking characteristics of the driver during perpendicular parking: driving forward into space, reversing into space | driving forward into space | 1 |
|---|---|---|
| | reversing into space | 9 |

→the setting of a value indicating the statistical significance to logical 1 ("true") means that the learned driver parameters can be used for adjusting the function (here by virtue of the clear preference for reversing into a parking space).

| 2.8 Preferred parking characteristics of the driver: Blocking of the front-seat passenger's door by the neighboring vehicle or centering of the vehicle in the parking space (in the case of perpendicular parking and nobody in front passenger's seat) | Vehicle centered | 4 |
|---|---|---|
| | Vehicle offset toward front-seat passenger's side | 3 |
| | Vehicle offset toward driver's side | 3 |

→the setting of a value indicating the statistical significance to logical 0 ("false") means that the learned driver parameters cannot be used for adjusting the function (here by virtue of no clear preference for an alignment of the vehicle in the parking space).

The learned parameters are only incorporated into the adjustment of the parking assistance system if:
a) The number of the parking maneuvers performed by the driver is to larger than a required minimum number; and
b) The value indicating the statistical significance for the respective parameter indicates that the parameter is statistically significant and is therefore suitable for adjusting the parking assistance system.

Is FIG. 3 shows by way of example a learned set of parameters following a plurality of parking maneuvers.

The learning method is more elaborate for the aforementioned step 2.10 "Parking accuracy desired by the driver (i.e. reaching a nominal parking position) vs. "Number of expended parking moves". The learning function first defines n accuracy zones around the nominal parking position, wherein n is a natural number. The accuracy in the x- and y-direction and the deviation of an alignment angle (in each case measured between the ego-position of the vehicle, to which the vehicle has been maneuvered by the driver, and the nominal parking position) can be determined as follows by the parking assistance system:

The following applies for n=3:
"Highly accurate in the x-direction" if the following applies:
|ego-vehicle_x−TP_x|<delta_x_highly accurate;
"Average accuracy in the x-direction" if the following applies:
|ego-vehicle_x−TP_x|<delta_x_average;
"Low accuracy in the x-direction" if the following applies:
|ego-vehicle_x−TP_x|<delta_x_low;
The same applies to the determination of the accuracy in the y-direction.

Figure 4:
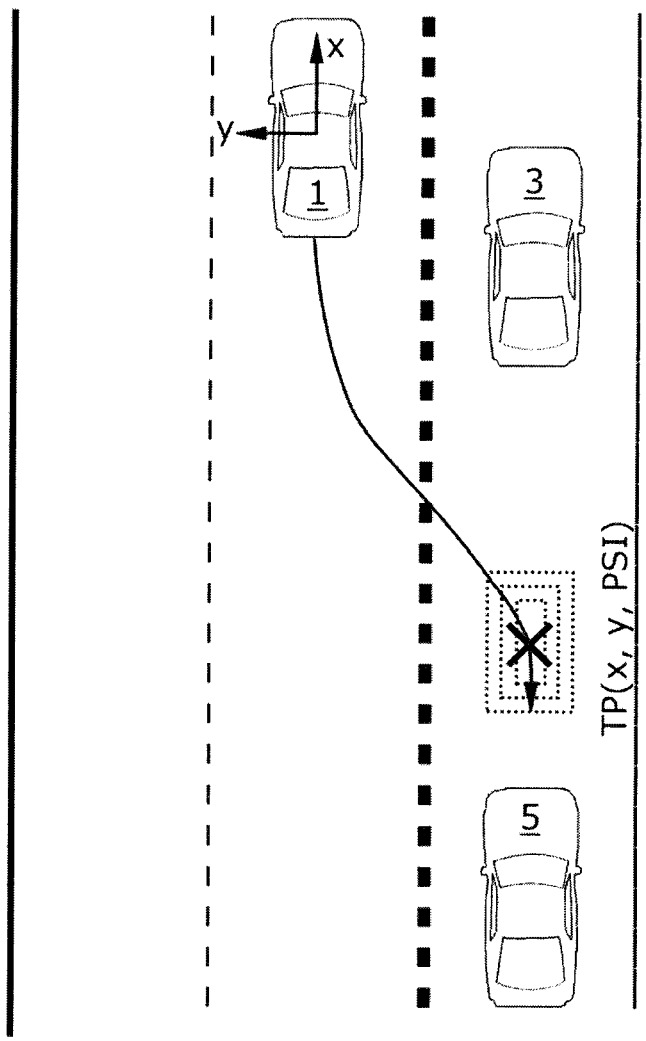
FIG. 4 shows by way of example and schematically a parallel parking situation of a vehicle from a starting position into a parking position, at which three accuracy zones are provided.

FIG. 4 shows the x/y-accuracy zones by dashed rectangles. The same accuracy classes apply equally to the alignment angle of the vehicle.

Figure 5:
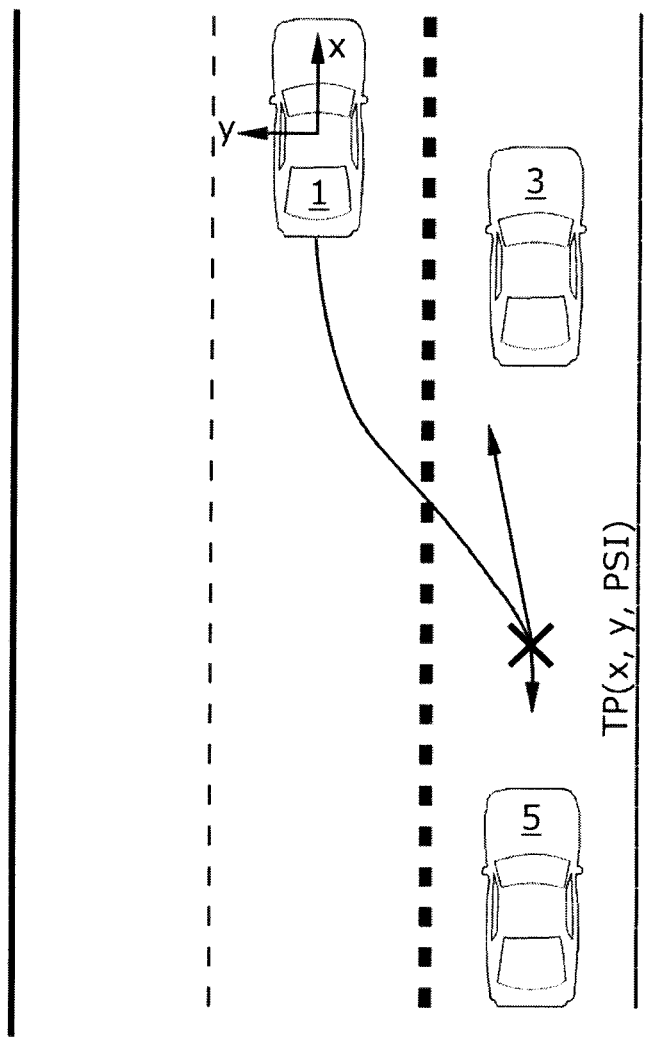
FIG. 5 shows by way of example and schematically a parallel parking situation of a vehicle into a parking position, wherein an alignment angle of the vehicle on reaching the parking position is indicated by the forward-facing arrow.

FIG. 5 shows the deviation of the alignment angle at the target position TP.

The basic idea of the algorithm is to learn:
how many additional parking moves the driver expends in order to achieve an improvement of the final parking position in the x-direction;
how many additional parking moves the driver expends in order to achieve an improvement of the final parking position in the y-direction;
how many additional parking moves the driver expends in order to achieve an improvement of the final parking position with respect to the alignment angle;

A resulting table which indicates the driver-specific acceptance of additional parking moves in order to achieve a higher parking accuracy could look like that represented in FIG. 6.

The learning algorithm works, for example, as follows:
1) The parking assistance system recognizes the maneuvering of the vehicle into a parking space performed by the driver;
2) The nominal parking position (target position TP) is calculated by the parking assistance system;
3) Following the performance of a parking move by the driver, it is established whether the x/y-coordinates of the vehicle are at least located in the lowest accuracy zone. The number of parking moves which were required to reach the lowest accuracy zone are recorded/saved;
4) Thereafter, the number of parking moves in order to reach a higher accuracy zone is established and, indeed, respectively for the x- and y-direction and the alignment angle of the vehicle. The number of parking moves in order to reach a higher accuracy zone are saved separately for the x- and y-direction and the alignment angle of the vehicle;
5) A plausibility function calculates the number of parking moves which the parking assistance system would have required in order to reach the higher accuracy zone. If the driver requires significantly more parking moves than the parking assistance system (for example 50% or more), the calculated number is used instead of the number of parking moves actually required.
6) If it is recognized that the final parking position has been taken up (for example, by switching off the ignition), the table is saved, associating it with the type of parking maneuver (parallel parking, perpendicular parking, oblique parking, etc.).

Such a table, as shown in FIG. 6, is saved for each parking maneuver performed by the driver. After a certain number of relevant parking processes executed by the driver (parallel parking, perpendicular parking, oblique parking, etc.) have been performed, an average of the parking moves is calculated.

FIG. 7 shows by way of example a table which indicates the driver-specific acceptance of additional parking moves in order to achieve a higher parking accuracy following multiple parking maneuvers performed by the driver.

A second flag (for example in the form of a Boolean value) indicates whether a recognized value is meaningful or not. This identifier indicates whether the number of parking moves expended by the driver deviates from the number of parking moves which the driver assistance system would require. If this flag is set (for example to logical "1"), the accuracy applied to this parking maneuver (in the x- and y-direction and alignment angle) is lowered to the value which has been established by the driver behavior.

During parking with the parking assistance system, it is constantly established whether the nominal parking position (target position TP) has already been achieved (if applicable with a certain tolerance range). If the nominal parking position has been reached, the automated parking function is terminated (for example also accompanied by an output at a user interface, by actuating the parking brake, etc.).

The automatic parking function of the parking assistance system is adapted as follows on the basis of the learned accuracy information:

If the first, low accuracy zone for the location coordinates in the x- and y-direction is achieved, the parking assistance function calculates the number of parking moves required in order to reach the next accuracy zone. If this calculated number is lower than the value learned by the driver behavior, the parking assistance function continues the automated parking process. If, however, the calculated number is (clearly) above the value learned by the driver behavior, the parking assistance function will not continue to try to further improve the parking accuracy. It is understood that in the event that the accuracy is satisfactory in the x-direction for example, but the accuracy in the y-direction has to be improved, the parking moves which are required to improve the accuracy in the y-direction are also utilized to further increase the parking accuracy in the x-direction. The method is repeated until such time as the position of the vehicle in the x- and y-direction lies within an acceptable region, i.e. it follows from the learned information that the driver would not accept any further parking moves in order to improve the parking accuracy.

The alignment angle of the vehicle is finally checked. A similar method is applied:

If the number of parking required moves for an improvement by an alignment angle class (for example an improvement by at least 2°) is too large, the parking assistance system will end the automatically performed parking process. In the event that an improvement of the alignment angle results in a deterioration of the alignment in the x- or respectively y-direction (for example in the form of a lower accuracy zone), a similar method is applied: the improvement is only performed if a total improvement in the parking position finally taken up can be achieved by a number of parking moves accepted by the driver.

Adjusting the Trajectory Planning

The aforementioned parameters 2.1 to 2.4 are utilized in order to adjust the trajectory planning and trajectory control.

The trajectory of the vehicle is, for example, a list of x/y-coordinates with speed values, which are associated with each coordinate entry of said list. The speed profile and the curvature of said trajectory define the longitudinal and transverse acceleration of the vehicle, the steer angle and the steering angle speed. The parameters of the trajectory used during the automated parking process are adjusted on the basis of the learned driver parameters. Thus, for example, the speed profile of the trajectory calculated by the parking assistance system is adjusted in the event of too high an acceleration or respectively deceleration in the longitudinal direction, compared with the driver parameters. In the case of too high a lateral acceleration, the speed profile of the trajectory calculated by the parking assistance system is, for example, adjusted as a function of the curvature of the trajectory.

In addition, the algorithm planning the trajectory preferably plans the trajectory, taking account of the safety distances from objects in the surrounding region, in particular static objects. The maneuvering speed as a function of the distance from static objects can be adjusted according to the learned driver parameters. Thus, in the event that it is clear from the driver parameters that a driver perceives the driving behavior of the parking assistance system in such a way that it is driving too quickly toward surrounding objects, this can for example lead to a reduction in the speed. This adjustment can, for example, also have an influence on the steering angle speed. Thus, the steering angle speed can also be reduced when the speed is reduced.

If the driver parameters show a perception of the driver that the steer angle is too large in the vicinity of objects, the trajectory planner of the parking assistance system can utilize a maximum curvature of the trajectory in the vicinity of an object.

Adjusting the Parking Assistance Function to the Driver's Level of Confidence in the System a) Adjusting the parking parameters to an increased level of confidence in the parking assistance system The parking assistance system preferably adjusts the following parameters for each successfully performed, automated parking process:

Safety distance in the longitudinal direction from static objects (for example other vehicles);

Lateral safety distance from static objects (for example other vehicles);

Acceleration/deceleration gradients as a function of the distance from the objects in the surroundings;

Maneuvering speed as a function of the steer angle;

Maneuvering speed as a function of the steering angle speed;

Maneuvering speed as a function of the steer angle and the distance from surrounding objects When the parking assistance system or respectively the parking assistance function is utilized for the first time, the following values are increased, for example, by adding a safety value or by multiplying by a safety factor:

Safety distance in the longitudinal direction from static objects (for example other vehicles);

Lateral safety distance from static objects (for example other vehicles);

When the parking assistance system or respectively the parking assistance function is utilized for the first time, the following values are reduced, for example, by subtracting a safety value or by multiplying by a safety factor:

Acceleration/deceleration gradients as a function of the distance from the objects in the surroundings;

Maneuvering speed as a function of the steer angle;

Maneuvering speed as a function of the steering angle speed;

Maneuvering speed as a function of the steer angle and the distance from surrounding objects.

In addition, a parameter "AP_use_cases_for_final_confidence" can be set to a predefined value, for example to the value 100.

In addition, an increment S can be calculated for a parameter delta_parameter_xx as follows:

S=delta_parameter_xx/AP_use_cases_for_final_confidence.

The parameter delta_parameter_xx indicates how far a specific parking parameter has to be altered by virtue of the fact that the driver does not yet have confidence in the parking assistance system.

This increment S is calculated for each automatically performed parking maneuver until a final set of parking parameters is reached and, indeed, as a result of the parameters delta_parameter_xx associated with the respective parking parameters being reduced in each case to zero.

It is understood that progressive or respectively degressive modifications to the parking parameters are also possible as a function of the number of automatically performed parking processes.

b) Adjusting the parking parameters to a reduced level of confidence in the parking assistance system During the performance of an automated parking process by the parking assistance system, driver interventions are preferably established, on the basis of which parking parameters of the parking assistance system are modified toward a higher level of safety. This establishment of the driver interventions can in particular be effected as a function of the present situation. The parking assistance function preferably estimates what the reason for the driver intervention was and adapts the relevant parking parameters on the basis thereof.

The following driver interventions can, for example, be established (individually or in combination) during the automatically performed parking process:

Gentle braking by the driver in order to adjust the speed, wherein the vehicle is a large distance from a surrounding object;
Gentle braking by the driver in order to adjust the speed, wherein the vehicle is a short distance from a surrounding object;
Gentle braking by the driver in order to stop the vehicle, wherein the vehicle is a large distance from a surrounding object;
Gentle braking by the driver in order to stop the vehicle, wherein the vehicle is a short distance from a surrounding object;
Emergency braking of the driver, wherein the vehicle is a large distance from a surrounding object;
Emergency braking of the driver, wherein the vehicle is a short distance from a surrounding object;
Driver touches the steering wheel;
Driver touches a user interface in order to end or respectively interrupt the parking assistance function;
Driver opens the door (from inside or from outside in the case of a remote-controlled parking process);
Driver shifts gear (manual or automatic transmission);
Driver operates the accelerator in order to override the parking function;
Driver operates the clutch.

The adjustment of the parking parameters toward a lower level of confidence of the driver in the parking assistance system can happen in the same way as was previously described with respect to the adjustment of the parking parameters toward a greater level of confidence of the driver in the parking assistance system.

Adjusting the Parking Assistance Function to Driver-Specific, Preferred Settings a) Selectability of parking for the disabled When this setting is activated, parking spaces which are reserved for disabled persons are also offered by the parking assistance function. Before this part of the parking assistance function can be utilized, the driver must define a parameter which indicates whether the latter is entitled to park in disabled parking spaces or not. This parameter is saved, associated with the respective driver. If the driver does not define this parameter prior to utilizing the parking assistance function, a user notice can be displayed the first time a parking space for disabled persons is recognized in order to prompt the driver to define this parameter.

In order to recognize parking spaces for disabled persons, a camera can for example be used, which recognizes appropriate notices on the road or on road signs. Said data obtained by the camera can preferably be enriched by data from a map of a navigation system. As a result, a start or respectively end point of a zone which is reserved solely for disabled persons can, if applicable, be established based on the GPS coordinates. The parking assistance function preferably assigns GPS coordinates to each recognized parking space, for example x-/y-coordinates of the respective corner regions of a parking space such that the parking assistance system allocates the attribute "parking only for disabled persons" to each recognized parking space or not.

Figure 8:
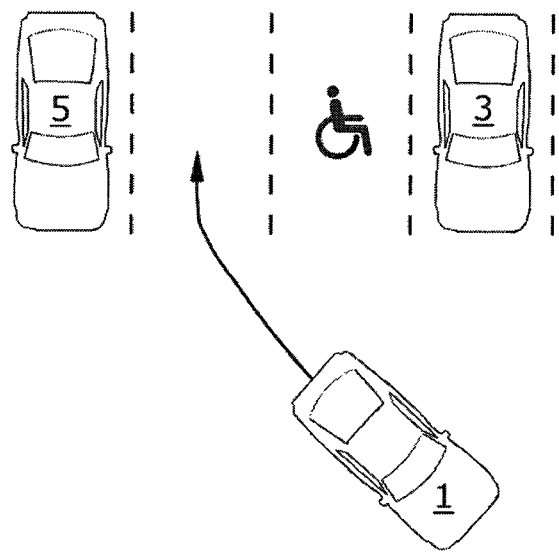
FIG. 8 shows by way of example and schematically a representation of a parking situation in a parking space for disabled persons.

FIG. 8 shows for example a representation of a parking space which is only provided for disabled persons.

In the event that no such zone information is mounted at the road side, the camera can recognize traffic signs directly in the region of the parking space or symbols which are provided on the ground of the parking space. Following the recognition of such a traffic sign or symbol, the respective parking space can be assigned the attribute "parking only for disabled persons".

Before the driver is offered a parking space by the parking assistance system, the parking assistance function checks the following:

a) Does the parking space have the attribute "parking only for disabled persons"? and
b) Does the parameter associated with the driver indicate that the latter may park in parking lots for disabled persons?

The parking space is then only offered to the driver if either the aforementioned conditions a) and b) are met or a) is not met.

b) Selectability of parking reserved for women

The parking assistance system can, for example, offer parking spaces which are only provided for women to park. The method can be executed in the same way as that under a) (parking for disabled persons).

c) Willingness to pay for parking

The parking assistance system can be designed to recognize whether parking in a certain parking space is subject to a charge or not and, depending on whether the driver is prepared to pay for parking spaces or not (for example thanks to a stored parameter), can offer the latter a parking space which is subject to a charge.

Depending on the respective country and location, parking spaces subject to a charge can be identified as follows:
Colored curbstones or colored lines on the ground (for example in Italy);
Signs in the region of the parking space or at the start of a zone for paid parking (for example in Germany);
Parking spaces with speed bumps to protect parking spaces subject to a charge.

The method according to a) (parking for disabled persons) described previously can be used in order to assign the attribute "paid parking" to the parking space.

The judgement "paid parking with speed bumps" can be made by object recognition of the speed bumps in the region of the parking space or by a wireless communication link between the car and a speed bump or respectively a payment system of such a speed bump.

The parking assistance function preferably checks the following before a recognized parking space is offered to the driver for automated parking:

a) Does a recognized parking space have the attribute "paid parking"?

b) Has the driver been assigned an attribute "prepared to pay for parking"?

The parking space is then only offered to the driver if either the aforementioned conditions a) and b) are met or a) is not met.

d) Selectability for residents' parking

The parking assistance function offers the driver parking spaces if the driver has indicated GPS coordinates for the area where he lives. The parking assistance function can be designed to obtain a confirmation from the driver if the parking assistance function is utilized to park outside the residents' area.

Incidentally, the method according to a) (parking for disabled persons) described above can be used in a similar way for the "residents' parking" functionality.

e) Activating/defining further parking characteristics

Figure 9:
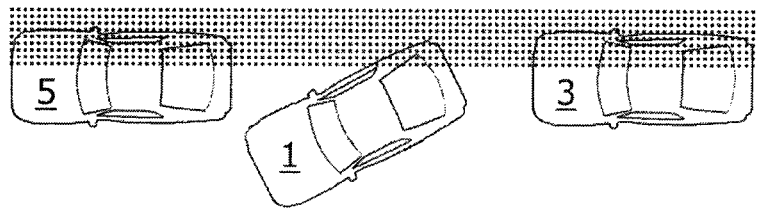
FIG. 9 shows by way of example and schematically a parallel parking situation, in which a vehicle is driven over a curb during parking in order to park on the latter.

The following parking characteristics can be activated in the parking assistance system:

The driver's acceptance of driving over curbs (see FIG. 9);

Parking in front of or respectively behind individual vehicles;

Willingness to allow the parking assistance function to drive forward directly into a parking space (see FIG. 10);

Willingness to react to changes in the parking situation during the parking process (dynamic rescheduling of the parking process) (see FIG. 11).

These parking characteristics can, for example, be adjusted directly by the driver in a setup menu of the parking assistance system.

Alternatively or additionally, these parking characteristics can, for example, be adjusted by information output at a user interface. In the case of driving over curbstones, corresponding information can, for example, be output at the user interface if the parking assistance function recognizes that driving over a curbstone is advantageous because other vehicles are parking in the same manner.

f) Preferences regarding driving into parking space: forward or respectively in reverse (during perpendicular parking)

As an alternative to the learning algorithm described above or in addition to this, a parameter which indicates the preferred parking direction during perpendicular parking can be adjusted by the driver himself.

This preference regarding driving into parking spaces can then be used as a preferred value by the parking assistance function, but the parking assistance system can also park differently if this is compulsory, for example, or offers technical advantages, for example, if a perpendicular parking space in a complex parking scenario cannot be reached in a maximum number of parking moves, for example by driving forward into a parking space.

The invention has been described above by means of exemplary embodiments. It is understood that numerous changes and variations are possible, without departing from the scope of protection defined by the claims.

The invention claimed is:

1. A method of controlling a parking process of a vehicle, comprising:

a) identifying a driver;

b) determining driver parameters during at least one manual parking process of the vehicle performed by the identified driver, and associating the driver parameters with the identified driver;

c) determining parking parameters based on the driver parameters by extracting, from the driver parameters, usual parking information that indicates how the identified driver usually performs a usual parking process;

d) successively adjusting the parking parameters depending on a number of previous autonomous parking processes that have been performed by the parking assistance system and are associated with the identified driver, wherein a safety distance from an object in surroundings of the vehicle is reduced and/or a speed of the vehicle is increased during the autonomous parking process after the number of the previous autonomous parking processes associated with the identified driver exceeds a specified value higher than one; and e) controlling, based on the parking parameters, an autonomous parking process of the vehicle performed by a parking assistance system by modifying the parking assistance system based on the usual parking information so that an autonomous parking behavior of the parking assistance system is adjusted to a driver-specific parking behavior that is dependent on the driver parameters associated with the identified driver, wherein the determining of the parking parameters includes averaging a plurality of the driver parameters specific to the identified driver which have been determined in at least a minimum number of different manual parking processes of the vehicle performed by the identified driver at different times.

2. The method according to claim 1, wherein the determining of the driver parameters comprises capturing a vehicle speed of the vehicle, a steering angle of the vehicle, a steering angle speed of the vehicle, a distance value of an object relative to the vehicle in a surrounding region of the vehicle, and/or acceleration or deceleration parameters of the vehicle.

3. The method according to claim 2, wherein the determining of the driver parameters comprises capturing the vehicle speed as a function of the steering angle, capturing the vehicle speed as a function of the steering angle speed, capturing the vehicle speed as a function of the steering angle and the distance value, and/or capturing the acceleration or deceleration parameters as a function of the distance value.

4. The method according to claim 1, wherein the determining of the driver parameters comprises collecting a plurality of measured values at chronologically successive measurement time points and establishing an average value of said measured values.

5. The method according to claim 1, wherein the determining of the driver parameters includes capturing and storing information regarding a parking direction, information regarding an alignment of the vehicle relative to a parking space in which the vehicle is parked, and information regarding a number of manual parking moves required for completing the manual parking process.

6. The method according to claim 1, wherein the determining of the driver parameters includes a step of checking whether parking process characteristics established during the manual parking process are each within a respective defined range, and the determining of the parking parameters is based on the driver parameters only when the parking process characteristics are each within the defined range.

7. The method according to claim 1, wherein the determining of the driver parameters comprises determining at least one tolerance parameter which indicates how far a manual parking position, to which the vehicle has been moved by the manual parking process performed by the identified driver, deviates from a nominal parking position determined autonomously by the parking assistance system.

8. The method according to claim 7, wherein the at least one tolerance parameter comprises a deviation of the manual parking position from the nominal parking position in a first spatial direction and a second spatial direction as well as a deviation of an alignment angle of the vehicle from a nominal alignment angle.

9. The method according to claim 7, wherein the at least one tolerance parameter comprises a number of manual parking moves required to reach the manual parking position during the manual parking process.

10. The method according to claim 7, further comprising:
determining a number of manual parking moves that were required during the manual parking process for the vehicle to arrive in the first accuracy zone or to travel from the first accuracy zone to the second, accuracy zone, and storing the determined number of manual parking moves as driver-specific parking move information,
wherein the determining of the at least one tolerance parameter comprises establishing a first accuracy zone and a second accuracy zone, wherein the second accuracy zone has a higher accuracy than the first accuracy zone.

11. The method according to claim 10, wherein the number of the manual parking moves is determined separately for position values of the vehicle respectively in at least two spatial directions and an alignment angle of the vehicle.

12. The method according to claim 1, wherein the controlling of the autonomous parking process by the parking assistance system comprises determining a number of autonomous parking moves that would be required by the parking assistance system to move the vehicle from the first accuracy zone to the second accuracy zone, and comparing the determined number of autonomous parking moves with the driver-specific parking move information to determine whether the autonomous parking process controlled by the parking assistance system is continued to achieve a higher parking accuracy by moving the vehicle to the second accuracy zone.

13. The method according to claim 1, further comprising influencing, based on the driver parameters a planning of an autonomous parking trajectory and/or an autonomous movement sequence of the vehicle for the autonomous parking process.

14. The method according to claim 1, further comprising capturing interactions of the driver with vehicle control devices of the vehicle and/or information regarding the driver himself during the autonomous parking process performed by the parking assistance system and, based thereon adjusting the parking parameters.

15. The method according to claim 1, further comprising additionally considering driver preferences of the identified driver during the determining of the parking parameters.

16. The method according to claim 15, further comprising retrieving the driver preferences during an initialization process and/or upon occurrence of a parking situation that makes information regarding a driver preference necessary.

17. The method according to claim 15, wherein the driver preferences include information regarding permission to park in parking spots reserved for disabled persons, regarding permission to park in parking spaces reserved for women or mothers and children, regarding a willingness to pay for parking, regarding permission to park in parking spaces reserved for residents in a specific region, regarding acceptance of driving over curbs, regarding a willingness to drive forward directly into a parking space, regarding a willingness to react to changes in a parking situation during the autonomous parking process, and/or regarding a preference to drive forward or reverse into a parking space.

18. A vehicle comprising a parking assistance system for controlling a parking process of the vehicle comprising:
identifying means for identifying a driver;
sensors for determining driver para meters during at least one manual parking process of the vehicle performed by the identified driver;
at least one memory unit in which the driver parameters are stored and associated with the identified driver;
at least one computer to determine parking parameters based on the driver parameters by extracting, from the driver parameters, usual parking information that indicates how the identified driver usually performs a usual parking process, and successively adjust the parking parameters depending on a number of previous autonomous parking processes that have been performed by the parking assistance system and are associated with the identified driver, wherein a safety distance from an object in surroundings of the vehicle is reduced and/or a speed of the vehicle is increased during the autonomous parking process after the number of the previous autonomous parking processes associated with the identified driver exceeds a specified value higher than one; and
a parking assistance system configured to automatically perform an autonomous parking process of the vehicle based on the parking parameters by modifying the parking assistance system based on the usual parking information so that an autonomous parking behavior of the parking assistance system is adjusted to a driver-specific parking behavior that is dependent on the driver parameters associated with the identified driver,
wherein the determining of the parking parameters includes a step of averaging a plurality of the driver parameters specific to the identified driver which have been determined in at least a minimum number of different manual parking processes of the vehicle performed by the identified driver at different times.

19. A method of controlling a parking process of a vehicle, comprising:
a) identifying a driver;
b) determining driver para meters during a manual parking process of the vehicle performed by the identified driver, and associating the driver parameters with the identified driver;
c) determining parking parameters based on the driver parameters;
d) successively adjusting the parking parameters depending on a number of previous autonomous parking processes that have been performed by the parking assistance system and are associated with the identified driver, wherein a safety distance from an object in surroundings of the vehicle is reduced and/or a speed of the vehicle is increased during the autonomous parking process after the number of the previous autonomous parking processes associated with the identified driver exceeds a specified value higher than one; and e) controlling, based on the parking parameters, an autonomous parking process of the vehicle performed by a parking assistance system, wherein:

the driver parameters determined in the step b) include at least one tolerance parameter that indicates how far a manual parking position, to which the vehicle has been moved by the manual parking process, deviates from a nominal parking position determined by the parking assistance system;

the determining of the at least one tolerance parameter comprises establishing a first accuracy zone and a second accuracy zone, wherein the second accuracy zone has a higher accuracy than the first accuracy zone, determining a number of manual parking moves that were required during the manual parking process for the vehicle to arrive in the first accuracy zone or to travel from the first accuracy zone to the second accuracy zone, and storing the determined number of manual parking moves as driver-specific parking move information; and the method further comprises at least one of:

a first feature wherein the determined number of manual parking moves is established separately for position values of the vehicle respectively in at least two spatial directions and an alignment angle of the vehicle, and/or a second feature wherein the controlling of the autonomous parking process by the parking assistance system comprises determining a number of how many autonomous parking moves would be required by the parking assistance system to move the vehicle from the first accuracy zone, to the second accuracy zone, and comparing the determined number of autonomous parking moves with driver-specific parking move information to determine whether the autonomous parking process controlled by the parking assistance system is continued to achieve a higher parking accuracy by moving the vehicle to the second accuracy zone, wherein the determining of the parking parameters includes averaging a plurality of the driver parameters specific to the identified driver which have been determined in at least a minimum number of different manual parking processes of the vehicle performed by the identified driver at different times.

20. The method according to claim 19, comprising the first feature.

21. The method according to claim 19, comprising the second feature.

* * * * *